US012084906B2

(12) United States Patent
Haemmerle et al.

(10) Patent No.: US 12,084,906 B2
(45) Date of Patent: Sep. 10, 2024

(54) CONTROL OF ACCESS SYSTEMS

(71) Applicant: WANZL GMBH & CO. KGAA, Leipheim (DE)

(72) Inventors: Juergen Haemmerle, Guenzburg (DE); Stephan Siegner, Waldkirch (DE)

(73) Assignee: WANZL GMBH & CO. KGAA, Leipheim (DE)

( * ) Notice: Subject to any disclaimer, the term of this patent is extended or adjusted under 35 U.S.C. 154(b) by 153 days.

(21) Appl. No.: 17/757,990

(22) PCT Filed: Oct. 21, 2020

(86) PCT No.: PCT/EP2020/079607
§ 371 (c)(1),
(2) Date: Jun. 24, 2022

(87) PCT Pub. No.: WO2021/180345
PCT Pub. Date: Sep. 16, 2021

(65) Prior Publication Data
US 2022/0412148 A1 Dec. 29, 2022

(30) Foreign Application Priority Data
Mar. 12, 2020 (DE) ..................... 10 2020 106 825.5

(51) Int. Cl.
*E05F 15/73* (2015.01)
*E05F 15/79* (2015.01)

(52) U.S. Cl.
CPC .............. *E05F 15/73* (2015.01); *E05F 15/79* (2015.01)

(58) Field of Classification Search
None
See application file for complete search history.

(56) References Cited

U.S. PATENT DOCUMENTS

2003/0033388 A1* 2/2003 Hom .......................... E06B 9/02 709/220
2010/0011665 A1 1/2010 Osann, Jr.
(Continued)

FOREIGN PATENT DOCUMENTS

DE 102012106404 A1 1/2014
EP 3279423 A1 2/2018

OTHER PUBLICATIONS

ISA European Patent Office, International Search Report Issued in Application No. PCT/EP2020/079607, Jan. 25, 2021, WIPO, 4 pages.

*Primary Examiner* — John F Mortell
(74) *Attorney, Agent, or Firm* — McCoy Russell LLP

(57) ABSTRACT

The present invention relates to the operation of an access system in line with requirements. If a normal operating mode is sensed, the following is carried out: measuring preconfigurable sensor data in order to determine a requirement parameter set of the access system, at least one dynamized setpoint value for controlling the access system being calculated from the determined requirement parameter set, and controlling the pivot arm element by means of the dynamized setpoint value such that operation of the access system in line with requirements is continuously ensured. If a special operating mode is sensed, the following is carried out: reading in a special operation configuration parameter set and controlling the pivot arm element by means of the special operation configuration parameter set which has been read in.

19 Claims, 5 Drawing Sheets

(56) References Cited

U.S. PATENT DOCUMENTS

| | | | | |
|---|---|---|---|---|
| 2013/0205666 | A1 | 8/2013 | Fortin et al. | |
| 2016/0284142 | A1 | 9/2016 | Elbling et al. | |
| 2019/0043290 | A1* | 2/2019 | Morris | G07C 9/00309 |

* cited by examiner

CONTROL OF ACCESS SYSTEMS

CROSS REFERENCE TO RELATED APPLICATIONS

The present application is a U.S. National Phase of International Application No. PCT/EP2020/079607 entitled "CONTROL OF ACCESS SYSTEMS," and filed on Oct. 21, 2020. International Application No. PCT/EP2020/079607 claims priority to German Patent Application No. 102020106825.5 filed on Mar. 12, 2020. The entire contents of each of the above-listed applications are hereby incorporated by reference for all purposes.

TECHNICAL FIELD

The invention relates to a controller of an access system with a pivot arm element that can, for example, comprise one or a pair of laterally pivoting doors or bows in order to limit the access of persons to a building or area.

BACKGROUND AND SUMMARY

Such pivot arm elements are used in access systems of various types such as, for example, in entry systems wherein the access of multiple persons is to be controlled in one direction (such as, for example, in supermarkets) and in turnstiles wherein the access of one person is to be controlled, who may however only pass through the access system in one direction. Such access systems are installed, for example, in company buildings or public buildings such as airports in order to control the flow of persons.

In an entry system it is provided that in a normal operating mode it only opens in one direction, the normal operating direction. In principle, a plurality of persons may also pass through the access system simultaneously (i.e. together). In special situations, however, a special operating mode (such as what is known as a panic function) can also be provided, wherein it is provided that, when a braking force is overcome, the access system opens in the direction opposite to the normal operating mode, i.e. in the opposite flow direction, for example in response to a fire alarm when as many people as possible must be evacuated from the access-controlled building.

Such systems in which a panic function has been implemented are known to the prior art, for example from DE 10 2012 106 404 B4.

The installation of capacitive sensors or ultrasonic sensors at the access system to sense the presence and/or the movement direction of a person in order, for example, to sense the movement direction of an entering person, is also known from the prior art. This is, for example, disclosed in EP 3 279 423 A1. If a person is detected in the access area of the system, this sensor signal is forwarded to the controller installed locally in a support of the access system, which thereupon opens the pivoting door/s.

The access systems known to the prior art are, however, always controlled according to fixed specifications, or operated according to a fixed pattern. This has the disadvantage that it is not possible to react flexibly enough to changes to the requirements for operation of the system.

A further problem of the known access systems is also that it is only inadequately possible to avoid unauthorized passage against the normal operating direction. In the particular case of entry systems installed in sales markets, for example, it has been observed that persons steal objects and leave the sales room via the access system in a direction opposite to the normal operating direction at a time when a further person is passing through the system in the normal operating direction and the swivel arm(s) of the access system are therefore in an open state.

The present invention has therefore addressed the task of overcoming the disadvantages described above and of providing an improved access system. It should, in particular, be possible to be able to react flexibly and quickly to different operating conditions and to different requirements. The security of the access system should, furthermore, be increased, in that the risk that persons leave the access system against the normal operating direction in an unauthorized manner while another person is entering in an authorized manner is reduced. In addition, further control facilities should be provided, so that the operator can make settings for control and/or regulation even after the access system has been delivered and/or even in the course of operation.

The subject is achieved through the appended patent claims, in particular by a method for controlling an access system, a computer program, a special operating controller, a normal operating controller, an electronic computing unit and an access system with such an electronic computing unit.

According to a first aspect, the invention relates to a method for controlling an access system (entry system or turnstile) with a (single, double or multiple-element) pivot arm element for access control for objects (e.g. persons with or without a shopping trolley/service cart and/or for electronic mobile devices such as robots), wherein the access system can be operated in at least two different operating modes, in a normal operating mode and in a special operating mode (such as in a panic operating mode, for example for a fire alarm), with the following method steps:

- sensing the current operating mode;
- if a normal operating mode is sensed:
- measuring preconfigurable sensor data to ascertain a requirement parameter set that represents the usage behavior of accessing persons when passing through the access system (i.e., for example, how quickly the persons approach, what volume the persons have and so forth) wherein, in particular by means of a setpoint value determiner, at least one dynamized setpoint value for controlling the access system is calculated from the ascertained requirement parameter set, and
- controlling the pivot arm element with the dynamized setpoint value, in particular by means of a normal operating controller, so that an operation in line with requirements of the access system is continuously ensured; and/or
- if a special operating mode is sensed:
- reading in a special operating configuration parameter set and
- controlling the pivot arm element, in particular by means of a special operating controller, with the special operating configuration parameter set that has been read.

A basic idea of the present invention is that of being able to control the pivot arm element that is intended to open or close the access area flexibly and, in particular, in line with requirements. If, for example, the access of a large but slow group persons that enter at about the same time is to be allowed, the access system needs to be operated and driven differently from when only one person wants to pass at high speed. This is above all against the background that the access system should, on the one hand, in principle only be in the open position for the shortest possible period of time in order to prevent as far as possible an unauthorized passage against the normal flow direction or the normal operating direction. On the other hand, the access system should not give rise to a "jam" that would hinder the current flow of persons.

A further fundamental idea of the present invention is also that of being able to deal with the panic operating mode or other types of special operating mode more flexibly. It should thus be possible, even after the system has been delivered, to be able to make on-site adjustments to the controller; in particular, the special operation should be controllable in accordance with preconfigurable criteria. In this way it is also possible, for example, to react to the respective specific requirement flexibly (e.g. how long the system should be operated in panic operating mode in the event of a panic, whether the pivot arm element should return immediately into the idle position after the panic function has been triggered, with what parameters the system should be driven in the event of a panic, and so forth).

In one preferred embodiment of the invention, it is provided that different sensors are provided, so that different types of sensor data are acquired in each case. This relates in particular to the normal operating mode. Thus, for example, a number, a volume, a speed and/or a movement direction of the persons can be sensed before the persons pass through the access system—and in particular the pivot arm element. The controller can thus be adjusted even better to the current requirement of the system and to the usage behavior of the accessing persons.

In a further advantageous embodiment of the invention, the access system is driven, in particular by means of a normal operating controller, to close immediately if a movement direction of a person in the operating region of the access system that does not correspond to a normal operating direction is detected. This embodiment thus relates in particular to the normal operating mode. The further sensors can advantageously be queried here in order to ascertain how quickly the person wants to gain access from the "wrong side" and/or how many persons there are, in order to carry out the control task depending on the result. A panic mode can, for example, be validated internally in this way, in that a check is made as to whether all the sensed sensor signals indicate an unauthorized leaving of the building (i.e. in particular: "'movement direction=opposite to normal operating direction' AND 'speed=high' and 'person is alone'"). Corresponding rules can be configured locally and on-site in the control of the system. This has the advantage that the controller can be adjusted even better to the current requirements of the system and the desired operating conditions and needs of the operator.

In a further advantageous embodiment of the invention, a function, in particular a formation of an average, is applied to the measured sensor data of a uniform sensor data type (i.e. for example to all the speed data), in order to calculate from them the at least one dynamized setpoint value. Multiple sensors can, for example, thus be provided for sensing the speed of the persons, for example at different positions in the access zone, i.e. in an upstream area of the access system. The measured speed signals are then averaged in order to ascertain the average speed. The same applies to the sensors for sensing the number of accessing persons and/or for the sensors for sensing the volume and so forth. This embodiment can, in particular, be applied in the normal operating mode. The control can in this way be made more secure, and incorrect control actions resulting from measurement errors can be avoided.

In a further advantageous embodiment of the invention, a function, in particular an evaluation function, is applied to the measured sensor data of a different sensor type originating, for example, from different sensors (for example number and speed measurement), i.e. to the different sensor data types, in order to calculate the at least one dynamic setpoint value from them. This embodiment can, in particular, be applied in the normal operating mode. The evaluation function can be preconfigured, but can also be adjusted or configured even during operation of the system. The evaluation function can, for example, comprise a prioritization of the acquired data (e.g. direction data is fundamentally relevant for ascertaining the requirement parameter set and are, for example, processed with the highest priority, while the volume data are less relevant). The evaluation function can access a configurable rule base in order to be able to cover comprehensively as many application scenarios as possible. The evaluation function is preferably implemented in software.

In a further advantageous embodiment of the invention, a position of the pivot arm element can be sensed continuously, in particular by means of an angle encoder (e.g. a Hall sensor), and fed back to a setpoint value determiner for calculating the at least one dynamized setpoint value. When security requirements are high, a regulation can thus be implemented that regulates the operation of the pivot arm element on the basis of the acquired sensor data (in particular the opening angle and the requirement parameter). This embodiment can, in particular, be applied in the normal operating mode.

Usually, a position of the pivot arm element is sensed continuously, and the requirement parameter set ascertained dynamically. This embodiment can, in particular, be applied in the normal operating mode.

Fundamentally, different variants can be designed for continuously sensing the current operating mode. Thus, for example, at least one angle sensor can be provided that senses an angular setting and/or position of the pivot arm element. In addition to the closed (idle) position, one or a plurality of opening positions can be defined that enable passage of persons in the normal flow direction (normal operating direction, permitted access). A special position can additionally be defined that signals if the pivot arm element has been pivoted out of the idle position against the normal operating direction. This signal can, for example, be processed by the controller to signal a special operating mode. The operating mode can also be specified by an external unit and transmitted to the controller via an appropriate interface, for example from an alarm signal transmitter (e.g. a central fire alarm). The controller can be designed for this purpose with a wireless or wired interface to the external unit.

In a further preferred embodiment of the invention, an additional verification should be applied when sensing the special operating mode. It can thus be provided that the latter is only deemed to have been sensed when a signal of at least one angle sensor is validated with a further signal that serves as the verification signal. The verification signal can, inter alia, comprise an optical signal, e.g. a camera for monitoring an access zone of the access system (upstream area), and/or signals for sensing a number, a direction of the flow of persons, or an external alarm signal, as described above.

In a further preferred embodiment of the invention, the at least one special operating configuration parameter comprises a setpoint value for a braking force that is applied to the pivot arm element preferably when said element moves against the normal operating direction (i.e. in a direction against the flow). In normal operation, the braking force is used to exercise a braking force on a rotary drive to avoid the pivot arm element being pivoted against the normal operating direction. This force must, however, be set such that it can be overcome in the event of a panic (it can, for example, be configured here that the braking force can also be applied by children or relatively small people). This has the advantage that an operator of the access system is free to decide how the access system should behave in the special operating mode. In particular, this concerns a value of the braking force to be applied, its duration and/or further signals such as the type of the alarm signal (e.g. acoustic and/or optical and/or as a digital signal to an external instance). A time interval can thus, in particular, be defined as a special operating configuration parameter, determining how long the setpoint value for a braking force is to be applied to the pivot arm element. It can thus furthermore for example be defined that for an adjustable period of time the pivot arm element should be held in an opened special operating position and should not swing back into an idle position, to ensure unhindered passage through the access system in the event of a panic.

In a further aspect, the invention relates to a computer program with computer program code for carrying out all the method steps of the method described above when the computer program is executed on an electronic computing unit, a special operating controller and/or a normal operating controller (and, in particular, on an electronic controller or regulator) of the access system.

In a further aspect, the invention relates to a special operating controller for an access system which is specified, when a special operating mode is sensed, to read in a special operating configuration parameter set through a configuration interface and to control a pivot arm element of the access system using the special operating configuration parameter set that has been read in. The configuration interface can be designed to read the special operating configuration parameter set in from an external electronic instance (e.g. a server) or from a user interface (a user interface such as a GUI at a central control computer). The configuration interface can be a component of the input interface or designed as the input interface. In the event of a panic, sensors, for example, that are arranged in the downstream area,—i.e. in an area considered, in the normal operating direction, to be "behind" the access system—monitor the access system in relation to the requirement parameters (such as the number, volume and so forth of the "fleeing persons"), and further special operating configuration parameters such as the duration of the special operating opening, the actuation of further alarm signal transmitters and so forth, can be calculated locally from this in the intelligent controller. In particular, it should be possible to configure how the pivot arm element should be operated or driven when a special operating mode is sensed. It can thus, for example, be configured that the pivot arm element, when in special operation, does not return again to its idle position (closed position, blocking the access), but should remain in the open position in order to keep the access free. Equally, it can also be configured that the pivot arm element should be returned to its idle position always, or after a time interval, also configurable, has elapsed.

The sensors can also be arranged in an upstream area (operating area) of the access system (in terms of normal operation). The sensors serve to detect objects, and can, in particular, comprise distance measurement and/or speed measurement. The distance measurement can be based here on methods known to the expert in the field, for example on measurement of the flight time behavior of the light pulse, a measurement of the phase angle of the reflected light (preferably laser light), or a triangulation principle. The sensors can, for example, be designed as ToF (time-of-flight) sensors or as lidar (light detection and ranging) sensors, wherein the latter are used for optical distance and speed measurement using laser beams.

It will be clear that, alternatively or in addition, other methods for acquiring the sensor data can be employed, such as the use of at least two light barriers or ultrasonic sensors.

In one advantageous development, a person-specific dataset that specifies the requirements of the particular person can be read in and used to calculate the setpoint value. It is, for example, possible to store in a database the fact that specific groups of persons authorized for access always require a specific opening width (e.g. service personnel who always have to enter with a wide servicing cart, or doctors who always have to enter an access-controlled operating theatre quickly). For this purpose, a reading means (e.g. in the form of an RFID reader) is installed in the upstream area of the access system in order to read a person-specific identifier (e.g. an RFID card). The reading means is designed to read the person-specific data encoded in the identifier, which is then transmitted to the normal operating controller and, in particular, to the setpoint value determiner, in order to determine the setpoint value in a need-specific and person-specific manner. The association between the person-specific identifier and the setpoint values can be stored in the database, and advantageously can also be changed during operation of the system.

In a further aspect, the invention relates to a normal operating controller for an access system that is designed, when a normal operating mode is sensed, to measure preconfigurable sensor data by means of sensors and to ascertain from these a requirement parameter set, wherein, in particular by means of a setpoint value determiner, at least one dynamized setpoint value for controlling the access system is calculated from the ascertained requirement parameter set, and wherein the normal operating controller is furthermore designed to control the pivot arm element with the dynamized setpoint value, so that operation of the access system that is continuously in line with requirements is ensured.

In a further aspect, the invention relates to an electronic computing unit that is designed to carry out a method as described above. The electronic computing unit is designed for operating an access system with a pivot arm element for access control for persons, wherein the access system can be operated in two operating modes, in a normal operating mode and in a special operating mode (e.g. panic operating mode), with:

- a switch for sensing the current operating mode;
- a special operating controller, as described above, and/or with
- a normal operating controller, as described above.

The invention also relates to an access system with such an electronic computing unit.

The terminology of the invention is explained in more detail below.

The access system can be an entry system (in only one direction passable in normal operation, but by multiple persons simultaneously) or a turnstile (passable in two directions, but only ever for one person at a time, separation).

The pivot arm element can comprise one, two, or more individual (separately) pivoting barrier elements, each of which is mounted on a vertical support (e.g. as laterally pivoting door or bow-like elements).

The access system can be used or operated in a normal operating mode (permitted access direction) and in a special operating mode (e.g. in the event of a panic such as a fire alarm). Requirement parameters in the form of the requirement parameter set are sensed for this purpose. The requirement parameters represent the usage behavior of the accessing persons. The requirement parameters thus represent the access requirement (how many persons want to enter, how fast these move, what volume they have, whether, for example, they want to enter with a high-volume shopping trolley or a service cart, and so forth). The requirement parameters that are to be used for the control in order to ascertain the setpoint value is preferably configurable. In one preferred embodiment of the invention, the following requirement parameters are taken into consideration when ascertaining the setpoint value:

- the number of persons entering (i.e. the persons in the access area of the system who want to pass the access system);
- the speed of the accessing persons; and/or
- the volume of the accessing persons (individual persons or group, with or without travelling element such as shopping trolley or service cart etc.).

These requirement parameters are aggregated into a requirement parameter set, stored locally, and processed into a setpoint value in accordance with reconfigurable rules. In one development, the requirement parameter set and/or the setpoint value can be transmitted to an external control unit (e.g. to an administration server), in order, for example, to control a plurality of access systems of the building in a coordinated manner.

The pivot arm element is controlled with reference to one or a plurality of manipulated variables by means of the setpoint value. If a plurality of different manipulated variables are to be controlled, the setpoint value is formulated as a setpoint value parameter set (vector variable). The setpoint value is thus preferably a parameter set, and contains a plurality of specifications (setpoint values) for different manipulated variables for the operation of the pivot arm element. The manipulated variables can comprise the following:

- an opening time point and a closing time point, i.e., in particular, when or at what point in time the pivot arm element should be driven to change its position and, in particular, to open and/or to close;
- an opening duration of the pivot arm element, i.e., in particular, how long the open position should be maintained; and/or
- an opening and/or closing speed with which the pivot arm element should be moved.

It can be configured such that specific requirement parameters of the requirement parameter set are provided for the control of specific manipulated variables. A meaningful adaptation to the requirements is thus possible. Is thus advantageously possible to ensure that, for example, a high sensed person volume and/or a high number of persons bring about a longer opening time period (opening duration, open state). Equally, a high sensed speed of the person(s) who are, for example, entering can bring about a high opening speed of the pivot arm element.

It is also possible to configure that a high speed of the entering person(s) initiates an earlier opening time point (output of the control signal to the pivot arm element) than in cases in which a slow speed is sensed. A control of the pivot arm element that is in line with requirements is thus achieved, while at the same time the risk that persons pass unauthorized through the access system against the normal operating direction as a result of an excessively long opening time is reduced.

The access system can have two zones or areas. Assuming a normal operating direction, there is an upstream area, i.e. an area of the access system prior to the pivot arm element, and a downstream area, i.e. an area of the access system following the pivot arm element (both viewed in the direction of normal operation). The sensors for sensing the requirement parameters can, in principle, be arranged in the upstream and downstream area, preferably being arranged in the upstream area for the normal operating mode.

BRIEF DESCRIPTION OF THE FIGURES

In the following detailed description of the figures, exemplary embodiments that are not to be deemed as restrictive, together with their features and further advantages, are discussed with reference to the drawing.

DETAILED DESCRIPTION

Figure 1:
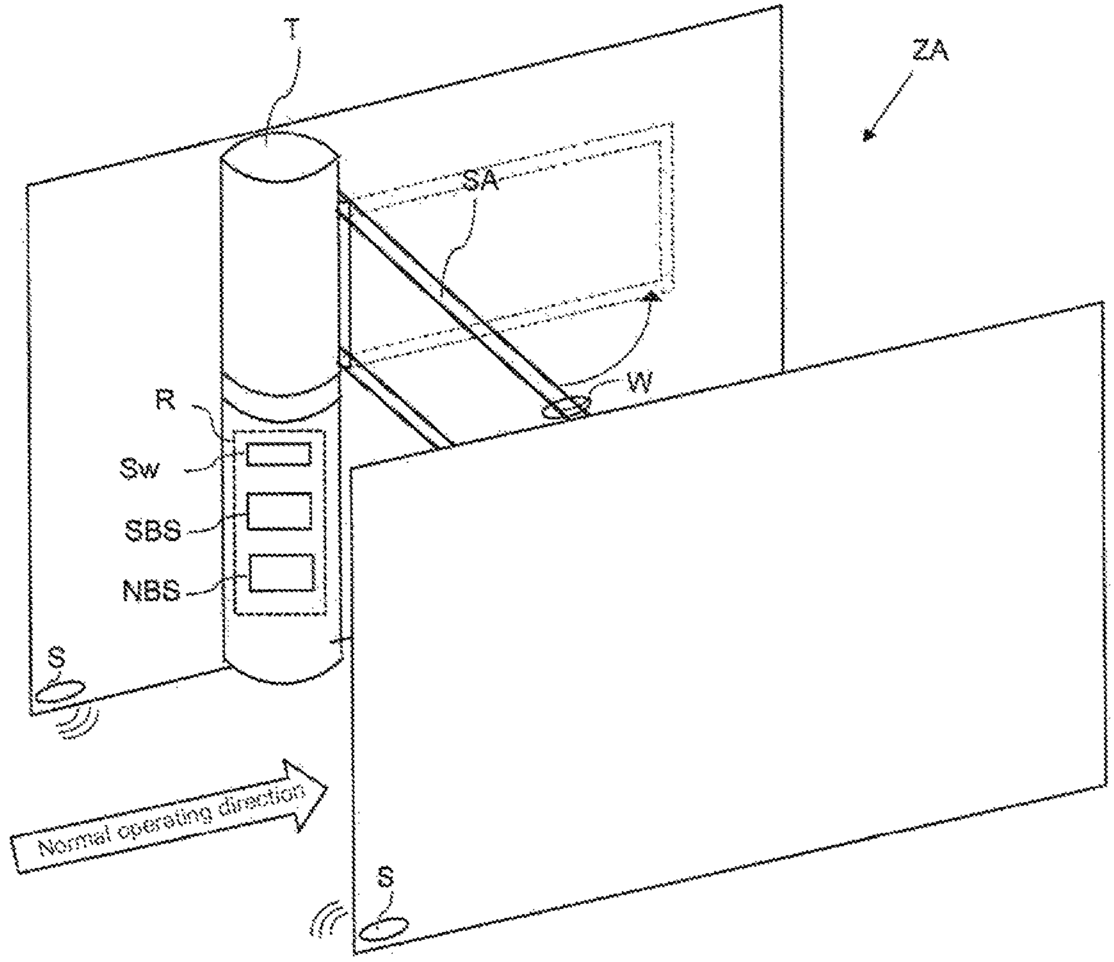
FIG. 1 shows, as an overview, a schematic illustration of an access system that is designed with a normal operating controller and/or a special operating controller.

FIG. 1 shows a simplified perspective illustration of an access system ZA, as can be installed in sales houses or access-controlled buildings. It can comprise a vertical support element T to which a pivot arm element SA mounted pivotably or, in particular, rotatably about a vertical axis of rotation. In this exemplary embodiment, the pivot arm element SA has one link. Other pivot arm elements (for example with two links) accordingly require a further support T; they are sufficiently well-known to the expert in the field, and therefore do not need to be explained in more detail. The support T can be integrated into lateral cheeks. The area outside the access system ZA and, in particular, outside the cheeks can be provided with access barriers in order to be able to guide the flow of persons and to limit or control access to the area “behind” the access system ZA. The term “behind” here refers to a normal operating direction.

The pivot arm element is located in an idle state in a closed position in order to close off the access but can, however—according to the requirements—be pivoted into an open position. This is indicated by the arrow in FIG. 1. The pivot arm element SA can thus, for example, be pivoted into an area of the cheeks in order to be pivoted through almost 90° in order to fully open the access. It can also be driven to other angular positions.

The access system ZA according to the invention is, inter alia, now characterized in that its operation can be controlled depending on the current requirements of the persons that are to enter. For this purpose, setpoint values are calculated continuously and dynamically, depending on the current usage behavior of the accessing persons. The calculation of the setpoint value is based on measured sensor data. Sensors S, simplified in FIG. 1, are provided for this purpose in the lower area of the lateral cheeks. Only two sensors are illustrated in FIG. 1 for reasons of simplicity. Multiple sensors of different types are usually designed. It will be clear to the expert in the field that the position of the sensors can also be arranged at a different position of the access system ZA, depending on the type. The sensors S sense different sensor signals, such as a speed of the accessing person, a number of persons in the upstream area of the access system ZA and/or an access situation and, in particular, whether the person is approaching the access system ZA with the mobile object (shopping trolley or service cart) with or without the accompaniment of other persons (e.g. children). In the latter case it can, for example, be assumed that access should be provided to a group of persons simultaneously. This has the consequence that the pivot arm element SA is driven specifically and, in particular, differently from when a single person wants access. A setpoint value can be ascertained for this purpose as a specification for the opening angle of the pivot arm element SA, and a further setpoint value as a specification for an opening duration. Both setpoint values are then used to control the pivot arm element SA.

As suggested by the dotted line in FIG. 1, a normal operating controller NBS and/or a special operating controller SBS can be integrated into a computing unit R. This is, however, optional, and therefore shown in FIG. 1 by a dotted line. Alternatively, the normal operating controller NBS and/or a special operating controller SBS, can also be designed directly (in particular in a controller). The controller is preferably located in the support T.

If a person wants to leave the access system ZA in an unauthorized manner, against the normal operating direction, this is blocked—the pivot arm element SA is located in the closed position, or is held there in a fixed position with a predefinable braking force. The angular position, or the position, of the pivot arm element SA is sensed by an angle sensor W, illustrated schematically in FIG. 1. It can, for example, be designed as a Hall sensor and/or comprise a counterpart (not illustrated in FIG. 1) that can, for example, be arranged in the support T. Other physical principles can equally well be employed to sense the angular position of the pivot arm element SA.

Figure 2:
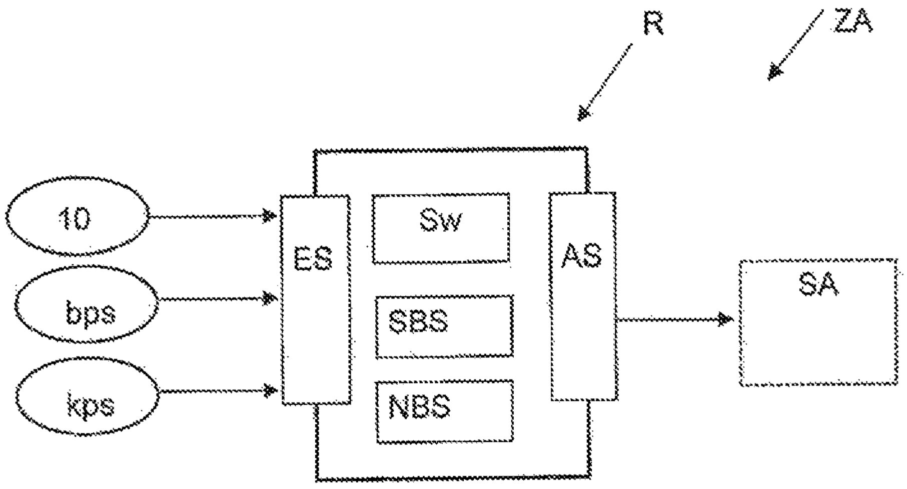
FIG. 2 is a block diagram of an access system that is constructed with a computing unit.

FIG. 2 shows the access system ZA with the requirements-dependent controller in the form of an electronic computing unit R, shown as a block diagram. An electronic computing unit R is designed at the access system ZA, preferably in the support T. It comprises an input interface ES to acquire sensor data 10, a requirement parameter set bps and/or a special operating configuration parameter set kps. In one variant, a requirement parameter set bps can already be calculated from the acquired sensor data 10 on a different unit, and is then read in by the computing unit R via the input interface ES. The computing unit R can preferably comprise a switch Sw whose purpose is to sense the current operating mode (normal operating mode or special operating mode). The switch Sw can also be designed as an interface to an external unit (e.g. a central alarm unit), via which it receives the operating mode. Otherwise, the operating mode can be ascertained locally on the switch Sw using the sensed or measured sensor signals, namely, in particular, using an angular position of the pivot arm element SA. The sensor data preferably also comprise the sensor data that are acquired by means of the angle sensor W. If, namely, the angle sensor W is used to sense that the pivot arm element SA has been pivoted out of the idle position (closed position) in opposition to the normal operating direction and against the braking force, the switch Sw can autonomously, and without further sensor signals, recognize a special operating mode.

The normal operating controller NBS and the special operating controller SBS serve to calculate control signals for driving the pivot arm element SA, and to transmit these via the output interface AS to the pivot arm element SA for the purpose of control.

Figure 3:
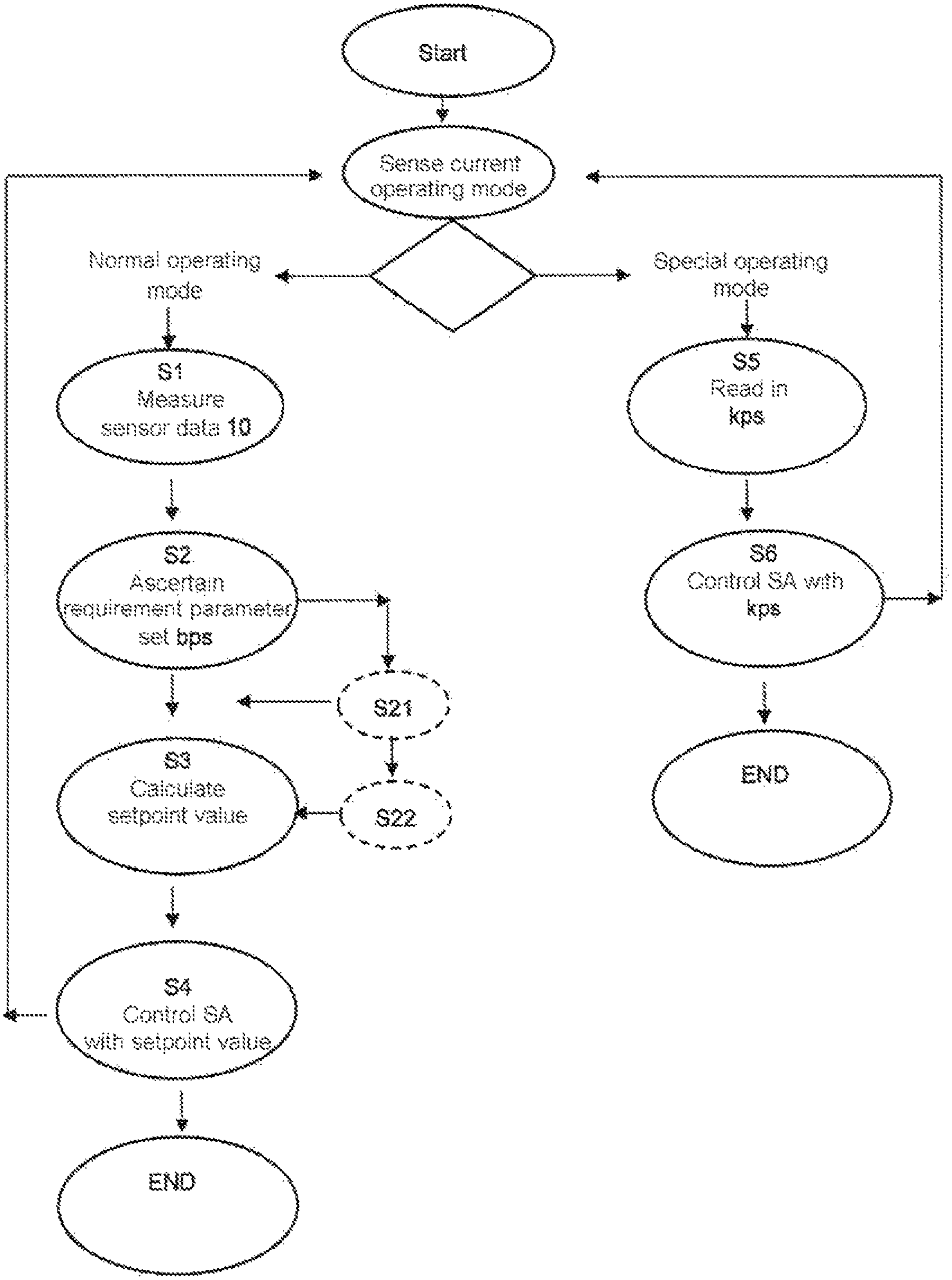
FIG. 3 shows a flow diagram of a method for the operation of an access system in two different modes according to one preferred embodiment of the invention.

The flow of the method will be described below in connection with FIG. 3. As already explained above, the operating state can be ascertained by means of the switch Sw. Depending on the ascertained operating state, two control measures can now be introduced, and these can be seen in the two vertical flows shown in FIG. 3.

In the case of the normal operating mode, the sensor data 10 are acquired in step S1, representing the current requirements for the access system ZA, therefore including the number and speed of the approaching persons. The sensors S in the upstream area of the system are preferably used for this. In step S2, a requirement parameter set bps is ascertained from the acquired sensor data 10. Centrally stored rules (e.g. for prioritization of the selected sensor data of a specific type) can be employed for this purpose. In addition, an averaging function can optionally be applied in step S21 and/or an evaluation function in step S22. Since these process steps are optional, they are shown with a dashed line in FIG. 3. These computing steps are carried out automatically, in particular in accordance with an algorithm, by means of software. The steps can, for example, be carried out on the computing unit R. In step S3, a setpoint value is calculated from the ascertained requirement parameter set, in order to control the access system ZA with it in step S4. The method can then end, or can be carried out iteratively, in that the current operating state is sensed continuously.

In the case of the special operating mode, the special operating configuration parameter set kps is read in in step S5. The special operating configuration parameter set kps can be preset and/or can be entered via a user interface UI at a central computing unit such as a server for the central control of the access system, and transmitted over a wireless or wired interface to the special operating controller SBS, which thereupon controls the pivot arm element SA using the special operating configuration parameter set in step S6. The special operating configuration parameter set KPS can thus define different control measures for the pivot arm element SA or for other units of the access system ZA. The special operating configuration parameter set kps can, for example, specify that it should remain in the special position (opened in opposition to the normal operating direction) for a predefined period of time, and should not be moved into the ideal position immediately or only after a specific time interval. Alarm signals (optical, acoustic), and/or the output of alarm messages, can, furthermore, be triggered. The method can then end, or can branch again to sensing the operating mode.

Figure 4:
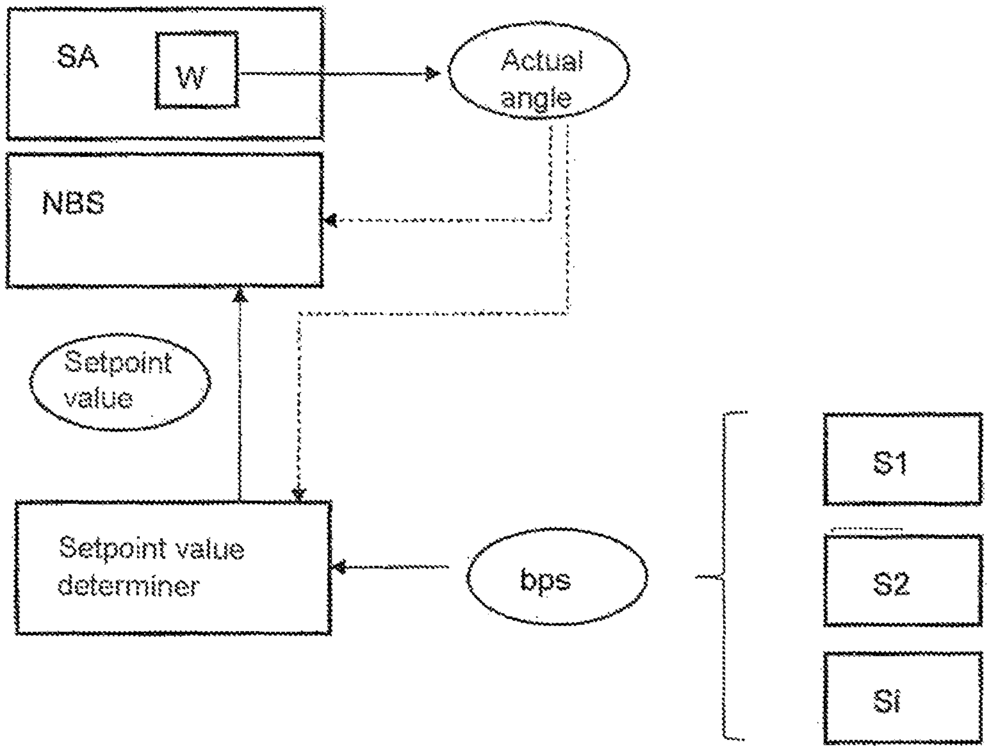
FIG. 4 shows an exemplary embodiment of a normal operating controller with further details.

FIG. 4 describes the normal operating control NBS in detail. In one exemplary embodiment, the access system ZA can be designed with only a normal operating controller NBS (without a special operating controller SBS). Different sensors S1, S2, Si serve to sense sensor signals 10 such as, for example, a speed of a person, a number of persons, a volume of persons and/or further parameters from which the requirement for the access can be derived. These data are aggregated, and can be stored locally and then supplied to a setpoint value determiner that is designed to calculate a dynamized setpoint value. In this context, "dynamized" means that the setpoint value does not have a fixed definition, but is ascertained newly each time, and continuously, depending on the current requirements. The setpoint value is variable over time. When the setpoint value is discussed in this application, this is always intended to be in the dynamized form, and is treated as such. The dynamized setpoint value ascertained in this way is then transmitted to the normal operating controller NB S which thereupon calculates control signals for driving the pivot arm element SA and transmits them to the pivot arm element SA for the purpose of control. Alternatively, the angle sensed by the angle sensor W can also be used for controlling the pivot arm operation. This is illustrated by the dashed arrow in FIG. 4. The sensed angle can be transmitted for the purposes of control to the setpoint value determiner or to the normal operating controller (which acts in this case as a regulator). The setpoint value determiner can be designed—and is preferably designed—to calculate a set of setpoint values in order to drive different aspects of the access system ZA such as, for example, a setpoint value for the opening angle, a setpoint value for the opening duration and/or a setpoint value for the pivoting speed and so forth. The setpoint value that should be taken into consideration or defined here can preferably be configured during a preparation phase.

Figure 5:
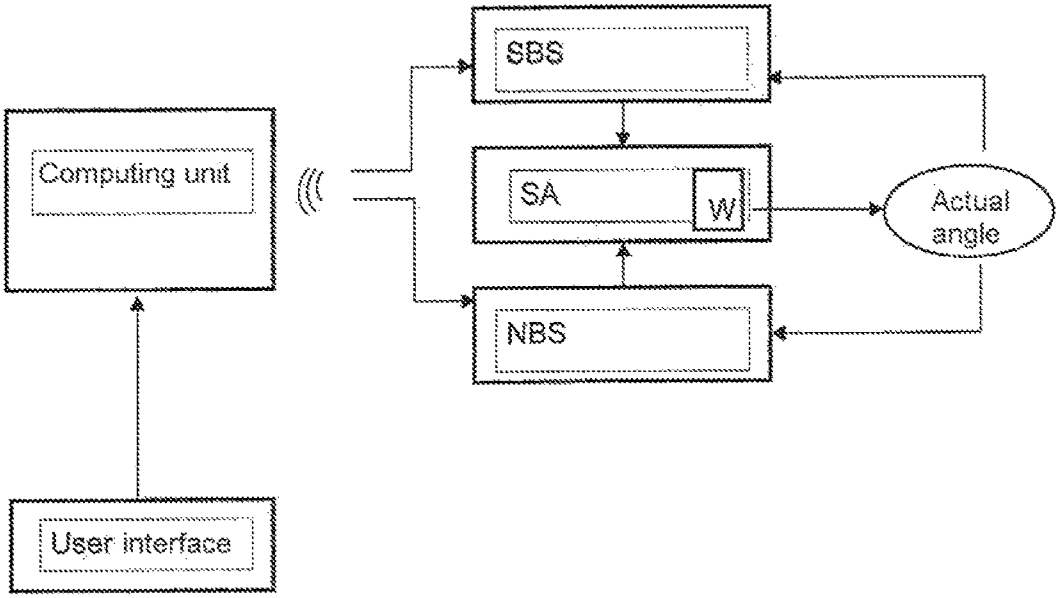
FIG. 5 shows an exemplary embodiment with a separate computing unit.

FIG. 5 describes the development of the invention explained above, in which the normal operating controller NBS and/or the special operating controller SBS can be designed as a control loop. The current angle, and with that the position of the pivot arm element SA, are sensed by the angle sensor W for this purpose, and are fed back to the normal operating controller NBS and/or the special operating controller SBS (closed-loop control). This can prove to be advantageous, in particular in highly safety-critical access monitoring, for example where the entry of an unauthorized person in opposition to the normal operating direction due to excessively long opening times of the pivot arm element SA must be securely avoided. The normal operating controller NBS and/or the special operating controller SBS are regulators in this case. In the case of special operation (for example in the presence of an alarm), it can thus be ensured that monitoring whether the pivot arm element SA is located in the defined setpoint position is continuous.

Figure 6:
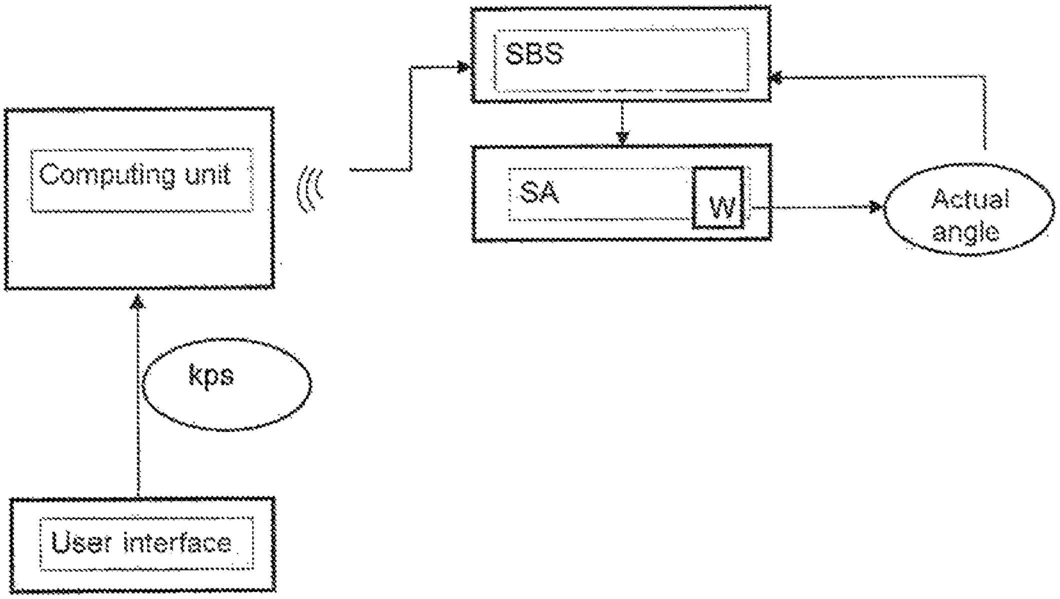
FIG. 6 is an exemplary embodiment of a special operating controller with further details in the form of a block diagram.

FIG. 6 describes an exemplary embodiment in which the access system ZA is constructed with only a special operating controller SBS (without a normal operating controller NBS). The special operating configuration parameter set kps can, for example, be entered via a user interface UI to a central server or control computer (for example in the context of the building administration) and transmitted to the special operating controller SBS. The special operating controller SBS can here also be operated as a regulator, namely if the angular position of the pivot arm element SA is monitored and sensed continuously, in order to continuously perform a continuous comparison of a setpoint value and an actual value of the angle. In one preferred embodiment of the invention, it is provided that both modules, both the normal operating controller NBS as well as the special operating controller SBS, are implemented in the access system ZA, but are or are not enabled depending on the presence of a license (the license key is ready in and monitored for this purpose). This has the advantage that only one variant of the access system needs to be delivered, and that different functionalities can nevertheless be enabled.

It should in conclusion be noted that the description of the invention and the exemplary embodiments are fundamentally not to be understood as restrictive in terms of a specific physical realization of the invention. All of the features explained and indicated in connection with individual embodiments of the invention can be provided in different combinations in the object according to the invention, in order to simultaneously realize their advantageous effects.

The protective scope of the present invention is given by the claims, and is not restricted by the features explained in the description or shown in the figures.

It is, in particular, obvious to the expert in the field that the invention can not only be applied to entry systems and turnstiles, but also for other types of access systems that should be operated in line with requirements. The realization of the components of the computing unit R can, furthermore, be distributed over a plurality of physical products.

The invention claimed is:

1. A method for control of an access system with a pivot arm element for access control for persons, wherein the access system can be operated in two operating modes, in a first operating mode and in a second operating mode, the method comprising:

sensing a current operating mode;

if the first operating mode is sensed: measuring preconfigurable sensor data to ascertain a requirement parameter set (bps) of the access system, wherein at least one dynamized setpoint value for controlling the access system is calculated from the ascertained requirement parameter set (bps), and control of the pivot arm element with the at least one dynamized setpoint value, so that operation of the access system that is continuously in line with requirements is ensured; and/or if the second operating mode is sensed: reading an operating configuration parameter set (kps), and control of the pivot arm element with the operating configuration parameter set (kps) that has been read in.

2. The method as claimed in claim 1, in which, when the first operating mode is sensed, the measured preconfigurable sensor data comprise different sensor data types and comprise a volume, a speed and/or a movement direction of the persons before the persons passed through the access system.

3. The method as claimed in claim 1 in which, when the first operating mode is sensed, the access system is caused to close immediately if a movement direction of a person in a downstream area of the access system that does not correspond to a normal operating direction is recognized.

4. The method as claimed in claim 1, in which, when the first operating mode is sensed, a function, is applied to the measured preconfigurable sensor data of a consistent sensor data type in order to calculate the at least one dynamized setpoint value from that.

5. The method as claimed in claim 1, in which, when the first operating mode is sensed, a function, is applied to the measured preconfigurable sensor data of a different sensor data type in order to calculate the at least one dynamized setpoint value from that.

6. The method as claimed in claim 1 in which, when the first operating mode is sensed, the requirement parameter set (bps) that has been ascertained comprises a volume and/or a number of persons that is used to control an opening angle of the pivot arm element.

7. The method as claimed in claim 1 in which, when the first operating mode is sensed, the requirement parameter set (bps) that has been ascertained comprises a volume and/or a number of persons that is used to control an opening time point and/or opening duration of the pivot arm element.

8. The method as claimed in claim 1 in which, when the first operating mode is sensed, the ascertained requirement parameter set (bps) comprises a speed of the persons that is used to control an opening speed of the pivot arm element and/or an opening time point for an output of a control signal to the pivot arm element.

9. The method as claimed in claim 1, in which, when the first operating mode is sensed, a position of the pivot arm element is sensed continuously, and is fed back to a setpoint determiner and/or to a first operating controller and/or to a second operating controller for calculating the at least one dynamized setpoint value.

10. The method as claimed in claim 1, in which, when the first operating mode is sensed, a position of the pivot arm element is sensed continuously, and the requirement parameter set (bps) is ascertained dynamically.

11. The method as claimed in claim 1, in which the current operating mode is sensed continuously using at least one angle sensor that senses an angular setting and/or position of the pivot arm element.

12. The method as claimed in claim 11, in which the second operating mode is only deemed to have been sensed when a signal of at least one angle sensor is validated with a further signal.

13. The method as claimed in claim 3, wherein the operating configuration parameter set (kps) comprises a setpoint value for a braking force that is applied to the pivot arm element when said element moves against the normal operating direction.

14. The method as claimed in claim 1, wherein the operating configuration parameter set (kps) comprises a time interval during which a setpoint value for a braking force should be applied to the pivot arm element.

15. The method as claimed in claim 1, in which the operating configuration parameter set (kps) causes an operating controller to hold the pivot arm element in an open operating position for an adjustable period of time.

16. An electronic computing unit configured to execute a computer program with computer program code for carrying out the method as claimed in claim 1.

17. An operating controller for an access system that is designed, when a first operating mode is sensed, to operate sensors in order to measure preconfigurable sensor data, and from these to ascertain a requirement parameter set (bps), wherein at least one dynamized setpoint value for controlling the access system is calculated from the ascertained requirement parameter set (bps), and wherein the operating controller is designed for controlling a pivot arm element with the at least one dynamized setpoint value, so that operation of the access system that is continuously in line with requirements is ensured.

18. An electronic computing unit for operating the access system with the pivot arm element for access control for persons, wherein the access system can be operated in two operating modes comprising a first operating mode and a second operating mode, the electronic computing unit comprising:

a switch for sensing a current operating mode; and the operating controller as claimed in claim 17.

19. The access system with the electronic computing unit according to claim 18.

* * * * *